US008827803B2

(12) United States Patent
Kelly

(10) Patent No.: US 8,827,803 B2
(45) **Date of Patent: *Sep. 9, 2014**

(54) GAME SYSTEM WITH COMMUNITY PLAY

(75) Inventor: Bryan Kelly, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,407

(22) Filed: Jun. 30, 2012

(65) Prior Publication Data

US 2013/0005428 A1 Jan. 3, 2013

Related U.S. Application Data

(63) Continuation of application No. 12/163,967, filed on Jun. 27, 2008, now Pat. No. 8,241,106.

(51) Int. Cl.
*A63F 13/00* (2014.01)
*G07F 17/32* (2006.01)

(52) U.S. Cl.
CPC ............ *G07F 17/3274* (2013.01); *G07F 17/32* (2013.01)
USPC .................................. 463/31; 463/20; 463/26

(58) Field of Classification Search
USPC ........................ 463/20, 16, 25, 26, 29, 30, 31
See application file for complete search history.

(56) References Cited

U.S. PATENT DOCUMENTS 5,342,047 A * 8/1994 Heidel et al. .................... 463/29
5,393,057 A * 2/1995 Marnell, II ...................... 463/13
6,517,433 B2 * 2/2003 Loose et al. .................... 463/20
6,652,378 B2 * 11/2003 Cannon et al. .................. 463/20
6,937,298 B2 * 8/2005 Okada ............................. 349/58
7,070,504 B2 * 7/2006 Iwamoto .......................... 463/20
7,140,963 B2 * 11/2006 Kojima ........................... 463/20
7,220,181 B2 * 5/2007 Okada ............................. 463/32
7,479,065 B1 * 1/2009 McAllister et al. ............. 463/37
7,699,316 B2 * 4/2010 Seelig et al. .............. 273/144 B
2002/0183105 A1 * 12/2002 Cannon et al. .................. 463/16
2003/0148804 A1 * 8/2003 Ikeya et al. ..................... 463/16
2003/0153385 A1 * 8/2003 Ikeya et al. ..................... 463/31
2003/0176214 A1 * 9/2003 Burak et al. ..................... 463/20
2003/0224852 A1 * 12/2003 Walker et al. ................... 463/20
2004/0198485 A1 * 10/2004 Loose et al. .................... 463/20
2005/0014554 A1 * 1/2005 Walker et al. ................... 463/20
2005/0197183 A1 * 9/2005 Walker et al. ................... 463/25
2006/0046822 A1 * 3/2006 Kaminkow et al. ............. 463/16
2006/0052152 A1 * 3/2006 Tedsen et al. ................... 463/16
2006/0079331 A1 * 4/2006 Moshal ........................... 463/42
2006/0160614 A1 * 7/2006 Walker et al. ................... 463/29
(Continued)

*Primary Examiner* — James C McClellan
(74) *Attorney, Agent, or Firm* — Paul Hickman; Marvin Hein

(57) ABSTRACT

The claimed embodiments contemplate methods, systems and apparatuses directed to gaming machines that provide a common reel display for multiple players. Various combinations of reel lines, utilized to determine possible wins from symbols across multiple reels, of the reel display, may be available to the players. For example, a first player may be permitted to bet on one set of reel lines and a second player may bet on another set of reel lines. Also, for example, both players may bet on some reel lines and other reel lines may only be available to certain players. A community reel line may also be made available to both players or perhaps just one player upon satisfaction of certain conditions. The ability to have multiple players bet on a common reel display advantageously adds to the excitement and enjoyment of a gaming session.

16 Claims, 9 Drawing Sheets

(56) References Cited

U.S. PATENT DOCUMENTS

| | | | | |
|---|---|---|---|---|
| 2007/0026936 | A1 * | 2/2007 | Gatto et al. | 463/25 |
| 2007/0060255 | A1 * | 3/2007 | Baerlocher et al. | 463/16 |
| 2007/0149278 | A1 * | 6/2007 | Walker et al. | 463/20 |
| 2009/0124385 | A1 * | 5/2009 | Cuddy et al. | 463/42 |
| 2009/0227357 | A1 * | 9/2009 | Rasmussen | 463/21 |
| 2010/0267444 | A1 * | 10/2010 | Walker et al. | 463/23 |

* cited by examiner

GAME SYSTEM WITH COMMUNITY PLAY

CROSS REFERENCE TO RELATED APPLICATION

This application is a continuation of U.S. Ser. No. 12/163,967, filed Jun. 27, 2008, which is incorporated herein by reference.

BACKGROUND

Various types of gaming machines have been developed with features designed to captivate and maintain player interest. In general, a gaming machine allows a player to play a game of chance in exchange for a wager. Depending on the outcome of the game, the player may be entitled to an award which is paid to the player by the gaming machine, normally in the form of currency or game credits. Gaming machines may include flashing displays, lighted displays or sound effects to capture a player's interest in a gaming device.

Another important feature of maintaining player interest in a gaming machine includes providing the player with many opportunities to win awards such as cash or prizes. For example, in some slot machines, the display windows show more than one adjacent symbol on each reel, thereby allowing for multiple-line betting. Some gaming machines offer a player an opportunity to win millions large prizes by providing progressive jackpots. Additionally, feature games of various types have been employed to reward players above the amounts typically awarded on a standard game pay schedule. Generally, such feature games are triggered by predetermined events such as one or more appearances of certain combinations of indicia in a primary game. In order to simulate interest, feature games are typically set to occur at a gaming machine on a statistical cycle based upon the number of primary game plays.

While gaming machines, including feature games, have been very successful, there remains a need for games that provide a player with enhanced excitement and increased opportunity of winning.

The foregoing examples of the related art and limitations related therewith are intended to be illustrative and not exclusive. Other limitations of the related art will become apparent to those of skill in the art upon a reading of the specification and a study of the drawings. Additionally, limitations and disadvantages of the related art may become apparent from review of other related art itself.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An embodiment, by way of non-limiting example, provides a game system that includes a plurality of game apparatuses wherein each game apparatus includes a first play station, a second play station, a common reel display of the first and second play stations and a spin mechanism causing the common reel display to spin. Additionally, different reel lines of the common reel display are reserved for the first and second play stations.

Another embodiment, by way of non-limiting example, provides a game system that includes a plurality of game apparatuses wherein each game apparatus includes a first play station, a second play station, a common reel display of the first and second play stations and a spin mechanism causing the common reel display to spin. Also, reel lines of the reel display are reserved for both the first and second play stations.

Another embodiment, by way of non-limiting example, provides a game system that includes a plurality of game apparatuses wherein each game apparatus includes a first play station, a second play station, a common reel display of the first and second play stations and a spin mechanism causing the common reel display to spin. Furthermore, different reel lines and at least one shared reel line are reserved for the first and second play stations.

In addition to the example aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting—they provide examples of embodiments.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. These details are intended to be illustrative examples and not limitations of an inventive scope.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

It should also be noted that various gaming machine implementations mentioned in reference to specific embodiments may also be implemented via other embodiments even if it is not expressly stated to do so.

Embodiments described herein contemplate methods, systems and apparatuses directed to gaming machines that provide a common reel display for multiple players. Various combinations of reel lines, utilized to determine possible wins from symbols across multiple reels, of the reel display, may be available to the players. For example, a first player may be permitted to bet on one set of reel lines and a second player may bet on another set of reel lines. Also, for example, both players may bet on some reel lines and other reel lines may only be available to certain players. A community reel line may also be made available to both players or perhaps just one player upon satisfaction of certain conditions. The ability to have multiple players bet on a common reel display advantageously adds to the excitement and enjoyment of a gaming session and, therefore, the profitability of the machine.

Figure 1:
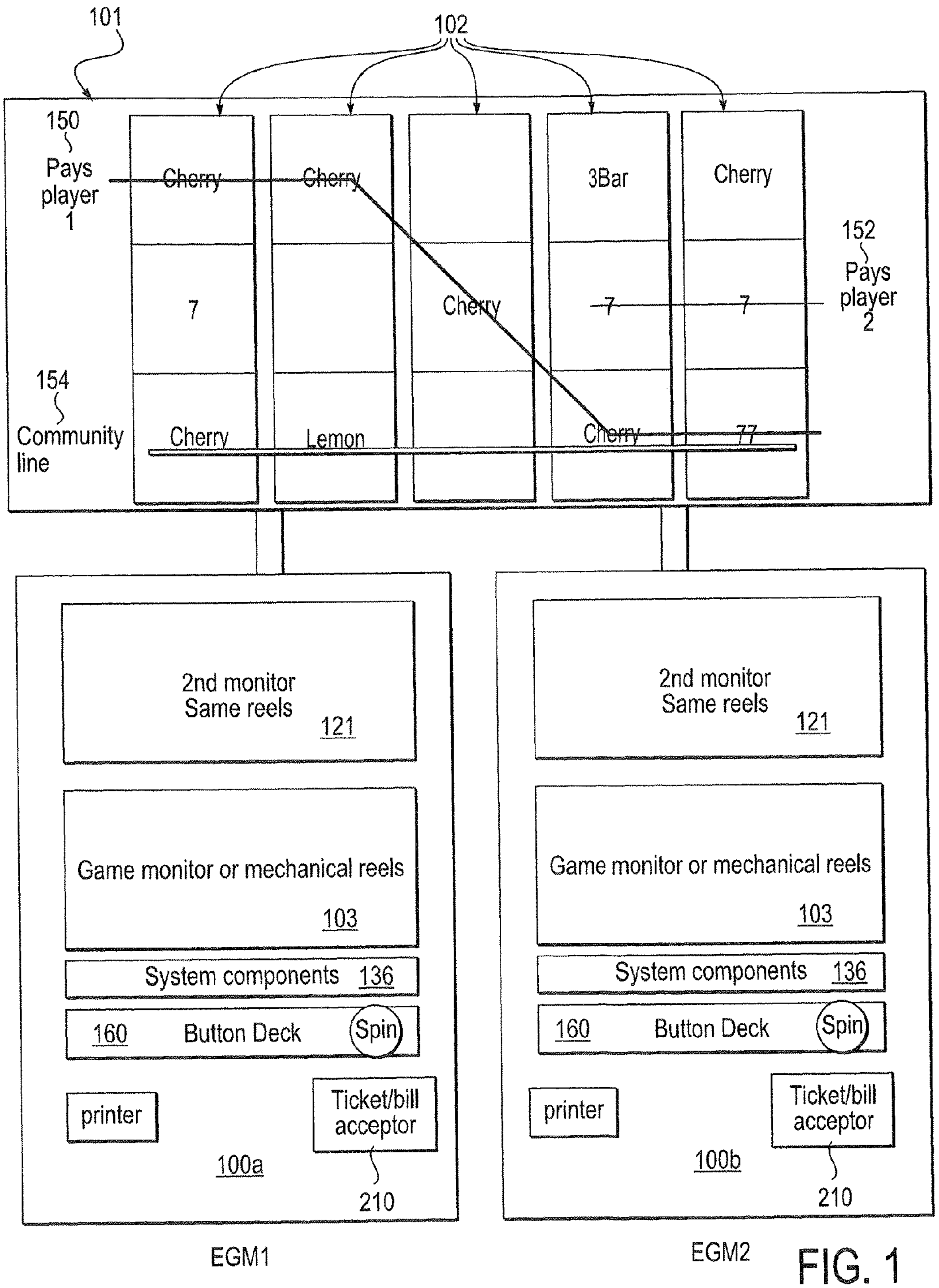
FIG. 1 is a diagram of example gaming machines with a common reel display that may be utilized by the claimed embodiments.
Figure 2:
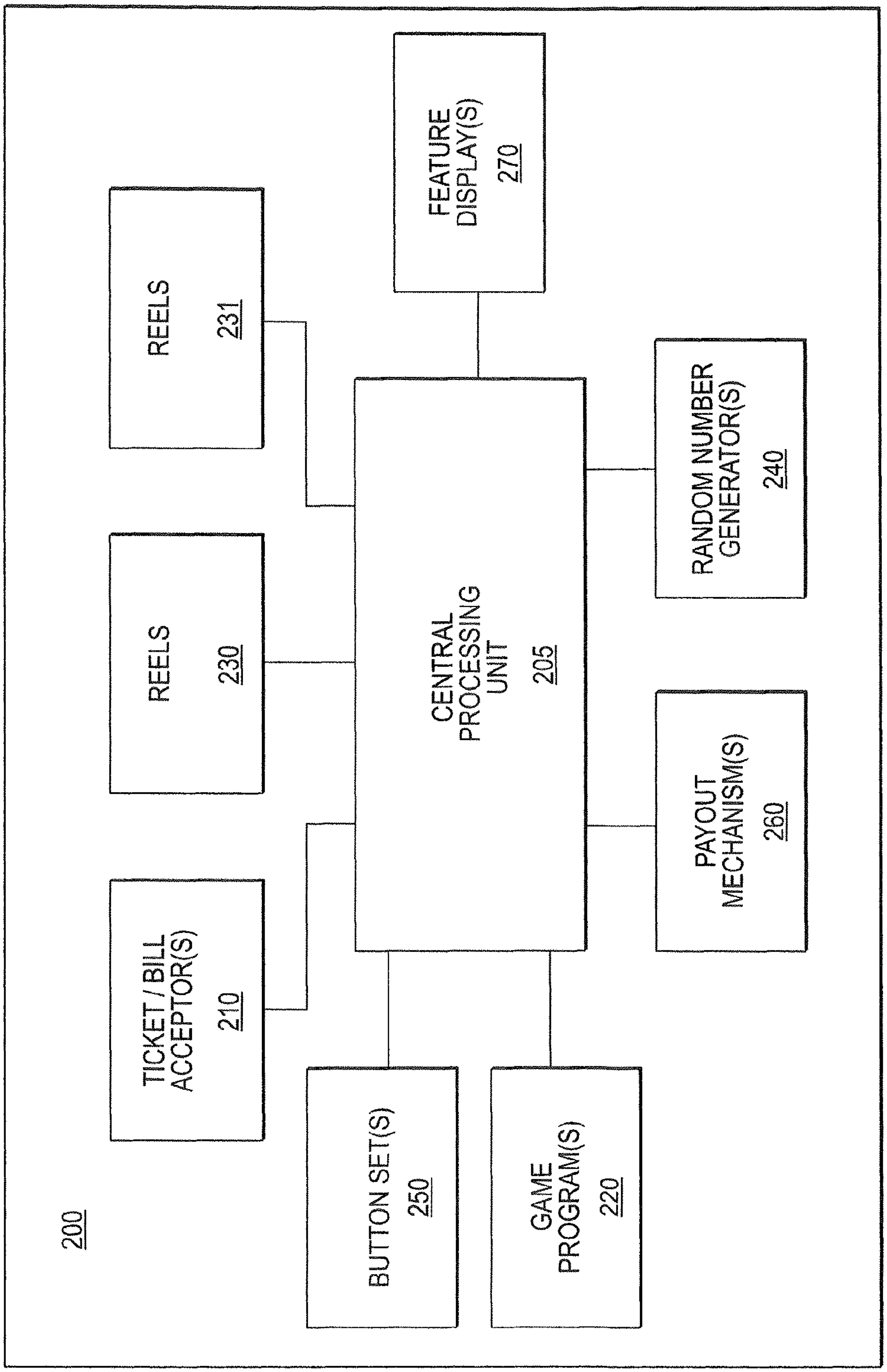
FIG. 2 is a block diagram illustrating examples of physical and logical components of the gaming machines of FIG. 1, in accordance with an embodiment.
Figure 3:
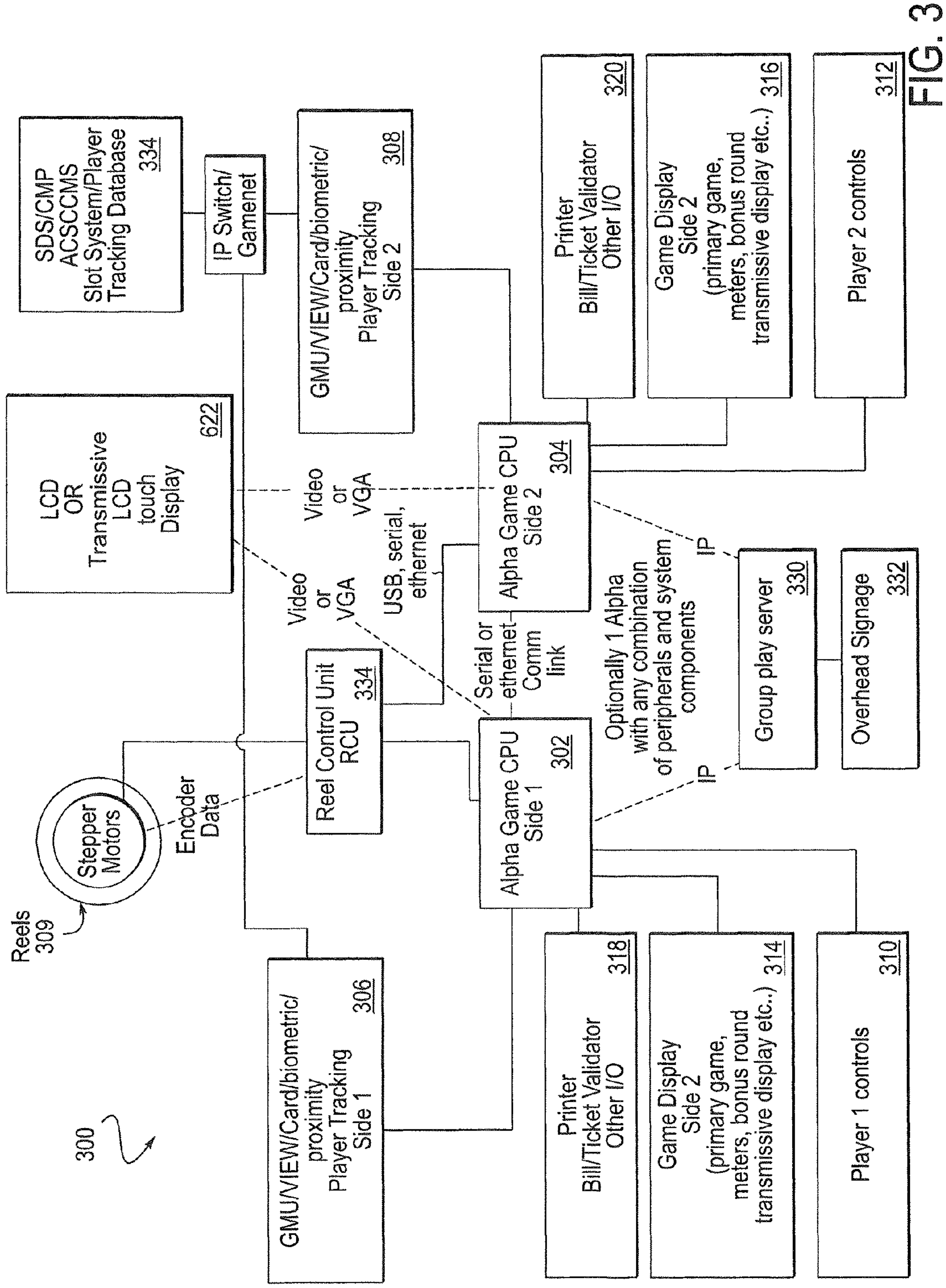
FIG. 3 is a block diagram illustrating examples of electrical components of the gaming machines of FIG. 1, in accordance with an embodiment.

Aspects of the claimed embodiments may be realized via FIG. 1 which is a block diagram of gaming machines 100*a*, 100*b* with a common reel display, FIG. 2 which is a block diagram illustrating physical and logical components of the gaming machines 100*a* or 100*b* and FIG. 3 is a block diagram illustrating electrical components of the gaming machine 100 of FIG. 1.

Turning to FIG. 1, gaming machines 100*a* and 100*b* are configured to allow a player at each gaming machine to bet on lines from a common set of reels 102 located in overhead signage 101. Gaming machines 100*a* and 100*b* may also be configured to be housed in one cabinet with two play stations.

Each gaming machine 100*a*, 100*b* includes cabinet housing 120, game monitor 121 which also displays the reel set 102 as shown in overhead signage 101, an additional game monitor or perhaps another set of reels 103, button deck 160, system components 136, ticket/bill acceptor 210 and one or more speakers (not shown). In the embodiment of one gaming machine with two play stations, one ticket/bill acceptor may be utilized for both play stations with an option available to split inserted funds between the two play stations.

Overhead signage 101 is typically activated when both gaming machines 100*a* and 100*b* are in use. Each player's reel lines 150, 152 are rendered on the overhead signage 101 as well as a community line 154. Winning combinations from reel line 150 is awarded to the first player while winning combinations from reel line 152 are awarded to player 2. Potential awards will typically be scaled based on the player's wager. Winning combinations from community reel line 154 is awarded to both players, when community reel line 154 is available. Some conditions that can make community reel line 154 available include, but are not limited to, group play (gaming machines 150 and 152 are both in use), bonus play and tournament mode. Bonus play may be started due to a certain level or amount of wagering by a single or both players. Tournament play will typically involve more than 2 players, the third or more players at additional gaming machines. Bonus community lines, in various implementations, may be given to specific players of a select group of players like club level or bus groups. If they play together then they may get the community lines. This encourages the group to play at once more or less simultaneously. Once a player, and their associated group, is identified the system or perhaps the game decides to allow the community line to show up based upon this group and other triggering criteria such wagering size, wagering rate, loss rate, etc.

Cabinet housing 120 is a self-standing unit that is generally rectangular in shape and may be manufactured with reinforced steel or other rigid materials which are resistant to tampering and vandalism. Cabinet housing 120 houses one or more processors, circuitry and software (not shown) for receiving signals from the button deck 160, operating the games and transmitting signals to the respective displays and speakers.

Any shaped cabinet may be implemented with any embodiment of the gaming machine 100 so long as it provides access to a player for playing a game. For example, cabinet 120 may also comprise a slant-top, bar-top or table-top style cabinet. The operation of gaming machines 100*a* and 100*b* are described more fully below.

Reels set 102 may be mechanical, video or combinations thereof. For video reels, overhead signage 101 is, typically, a CRT or flat panel display in the form of, but not limited to, liquid crystal, plasma, electroluminescent, vacuum fluorescent, field emission or any other type of panel display known or developed in the art.

The button deck 160 may be used for various functions such as, but not limited to, selecting a wager denomination, selecting a game to be played, selecting a wager amount per game, initiating a game or cashing out money from gaming machine 100. Button deck 160 function as input mechanisms and may include mechanical buttons, electromechanical buttons, touch screen buttons or other types of buttons. Optionally, a handle (not shown) may be rotated by a player to initiate a game, thereby serving as a "button."

In other embodiments, button deck 160 may be replaced with various other input mechanisms known in the art such as, but not limited to, a touch screen system, touch pad, track ball, mouse, switches, toggle switches, levers, handles, knobs or other input mechanisms used to accept player input.

A spin mechanism is provided for players or servers to activate a community line game. Some non-limiting examples of spin mechanisms include a community spin button (which may utilize a button to activate a community reel game), separate spin buttons or touchscreen buttons to enable each player's game to execute whether playing a community reels game or independent game combo or theme, a server originated triggering event and an automatic game software triggered mechanism or event.

Game monitor 103 may present information such as, but not limited to, player information, advertisements and casino promotions, graphic displays, news and sports updates or even offer an alternative game. This information may be generated through a host computer networked with gaming machine 100*a* or 100*b* on its own initiative or it may be obtained by request of the player using either button deck 160; the game monitor 160 itself, if the game monitor 160 comprises a touch screen or similar technology; buttons (not shown) mounted about the game monitor 160 which may permit selections such as those found on an ATM machine, where legends on the screen are associated with respective selecting buttons; or any player input device that offers the required functionality.

Additional displays or components may be used for various purposes including additional game play screens, animated "top glass," progressive meters or mechanical or electromechanical devices such as, but not limited to, wheels, pointers or reels. The additional displays may or may not include a touch screen or touch glass system.

FIG. 2 is a block diagram illustrating examples of physical and logical components 200 of the gaming machine 100 of FIG. 1. Included is a central processing unit 205 to which various components are coupled. Those components include a ticket/bill acceptor(s) 210, reel sets 230 and 231, feature display(s) 270, random number generator(s) 240, payout mechanism(s) 260, game program(s) 220 and button set(s) 250.

CPU 205 may be a processor mounted on a gaming motherboard. For example, CPU 205 may be a microprocessor made by Intel, AMD or others. The gaming motherboard may be mounted with other components, similar to those that may be found on a personal computer motherboard, and is operable to be loaded with a gaming machine operating system ("OS") such as an Alpha OS installed within a Bally S900, M9000 or CineVision™ slot machine. CPU 205 executes a game program 220 that causes reel sets 230, 231 to display a game.

When a player has inserted a form of currency such as, for non-limiting example, paper currency, coins or tokens, cashless tickets or vouchers, electronic funds transfers or the like into the ticket/bill acceptor 210, a signal is sent to the CPU 205 which, in turn, assigns an appropriate number of credits for play. The play may further control the operation of the gaming machine 100, for example, to select the amount to wager via, for example, electromechanical or touchscreen buttons 250. The game may start in response to the player pushing one or more buttons 250 or an alternate mechanism such as a handle or touchscreen icon (not shown).

Random number generator 240 responds to instructions from CPU 205 to provide a display of randomly selected indicia on reel sets 230 or 231. In some embodiments, random number generator 240 may be physically separate from gaming machine 100; for example, it may be part of a central determination host system (not shown) which provides random game outcomes to CPU 205. Thereafter, the player may or may not interact with the game through electromechanical or touchscreen buttons 250 to change the displayed indicia.

CPU 205 under control of game program 220 (typically stored in read only memory or read/write memory) compares the final display of indicia to a pay table. The set of possible game outcomes may include a subset of outcomes related to the triggering of a feature game. In the event the displayed outcome is a member of this subset, CPU 205, under control of game program 220, may cause feature game play to be presented on feature display 270.

In one embodiment, reel set 102 are electomechanical reels. Game program 220 includes reel spinning firmware to provide proper signals for driving multiple stepper motors (not shown), which, in turn spin the reel set 102. Preferably, the motors are driven using a "full step" excitation sequence in which a single motor step is performed by changing the excitation sequence in which a single motor step is performed by changing the excitation on one of the two-phase inputs in a specified sequence. The sequence determines whether the direction implemented is forward or reverse. The reel drive pulse trains go through three distinct stages: acceleration, steady state and deceleration. During acceleration, reel set 102 are driven with a pulse frequency that is less than the maximum "start/stop" frequency. Typically, if a motor is attempted to be started with a high frequency pulse, the motor loses synchronization and slips. Therefore, preferably the drive frequency is incrementally increased until the steady state drive frequency is reached. At steady state, reel set 102 are driven for a specified number of steps at the maximum drive frequency before going to the deceleration phase. During deceleration, the process is reversed and the drive frequency decreased until the stopping frequency is reached. Preferably, this procedure helps to prevent reel set 102 from slipping past the proper stop position on deceleration. Finally, at the stopping point, the motor excitation signals are held constant.

Predetermined payout amounts for certain outcomes, including game outcomes, are stored as part of game program 220. Such payout amounts are, in response to instructions from CPU 205, provided to the player in form of coins, credits or currency via payout mechanism 260, which may be one or more of a credit meter, a coin hopper, a voucher printer, an electronic funds transfer protocol or any other payout means known or developed in the art. CPU 205 also maintains one or more sets of accounting meters (not shown) which encompass the credit meter, a wager meter and a win meter.

In various embodiments of gaming machine 100, game program 220 is stored in a memory device (not shown) connected to or mounted to the gaming motherboard. By way of non-limiting example, such memory devices include external memory devices, hard drives, CD-ROMs, DVDs and flash memory cards. In an alternative embodiment, the game programs are stored in a remote storage device. In one embodiment, the remote storage device is housed in remote server. The gaming machine may access the remote storage device via a network connection, a TCP/IP connection, a wireless connection or any other means for operatively networking components together. Optionally, other data including graphics, sound files and other media files for use with gaming machine 100 are stored in the same or a separate memory (not shown). Some or all of game program 220 and its associated data may be loaded from one memory device into another, for example, from flash memory to random access memory (RAM).

In one embodiment, the CPU 205 is operative to host multiple virtual machines that may be utilized to run various games, perhaps at a remote location. In another embodiment, the CPU 205 has multiple cores and each core is operative to run a gaming machine. In yet another embodiment, multiple CPUs are present and each CPU is operative to run a game on a gaming machine. In still yet another embodiment, CPU 205 contains more than one set of game instructions, each set corresponding to a different game.

Also, in an embodiment, each player may have their own set of accounting meters, each set maintained by separate CPUs. Similarly, each player may share one credit meter but then have separate wager and win meters. In another embodiment, one set of accounting meters is shared between multiple players.

FIG. 3 is a block diagram 300 illustrating, by way of example, electrical components of the gaming devices 100*a* and 100*b* of FIG. 1. However, it may also be implemented in a single cabinet with two play stations, for example. In one embodiment each gaming device utilizes a CPU 302, 304 and a game monitoring unit ("GMU") 306, 308 for player tracking. The CPUs 302, 304 may be in communication with each other to enable community reel line and other features. One of the CPUs 302, 304 may act as a master of both play stations. Or, the CPUs may exchange outcome information (reel stops and/or RNG outcomes) about their respective play stations. Reels 309 will typically be controlled by a reel control unit 334.

In one embodiment a video mixer processor board (not shown and also known as a Bally iVIEW DM, in various implementations) may combine video signals from two Bally Alpha base game processor suitcases and present the merged data on one shared video game screen by scaling their respective content. When screen content is scaled/positioned by the mixer, the normal touchscreen data generated by the touchscreen controller will generally also be resealed or adapted so newly positioned buttons, that are touched by the player, have the touchscreen controller's coordinates re-mapped to where the coordinates were originally for the non-scaled game content, for each processor. These re-scaled touchscreen presses may be sent to both game processors, so they can execute their respective business or game logic. This typically allows for two regulated gaming devices to be inside one cabinet and each render to the same game screen(s). Each gaming processor will typically operate as if it controls the whole screen to itself, when it actually does not, in various implementations. Each gaming processor may implement its own gaming logic as if it was a separate or adjacent gaming device. Messaging between the two gaming processors would occur to such that each knows the others state of the game, and all other data regarding community reels, wagers, outcomes, payouts, meters, etc.

Also, community reels would typically be shown at the junction of the mixed/merged video content rendered from each gaming processor. The Bally iVIEW DM mixing may be controlled by either base game processor upon request or by one machine designated as the master. One of the Alpha gaming processors video outputs may be configured by the iVIEW DM video mixer/scaler to take over the common display for certain modes of play including but not limited to bonus modes, single player mode, tournament mode, etc. Alternately, the Bally iVIEW DM mixer/scaler may be controlled by a server or a Bally iVIEW processor. Also, system-generated or other content can also be combined on screen using the Bally iView DM mixer/scaler. The output from one or two iVIEW processors may be rendered on a display screen. Additionally, more than two video game processors can be mixed/scaled to the same game screen(s) using the Bally iVIEW DM.

In some embodiments each CPU 302, 304 may utilize the same random numbers generated from a master random number generator (not shown) or utilize separate random number generators with and identical seeds to produce the same random number patterns.

In alternate embodiments there may only be one CPU and a credit card reader (not shown) and ticket/bill acceptor (not shown) attached to each GMU 306, 308. Each gaming device also typically has player controls 310, 312, game display 314, 316 for repeating a reel display of an overhead signage or provide other information and a printer 318, 320. One GMU, or perhaps one CPU, may be utilized to maintain a game session occurring at each play station. This can be realized by using a "game 2 system" (G2S) communication protocol.

Transmissive-touchscreen LCD overlay panels 622 may be used to provide information (video games, bonus rounds, game meters, alternate interfaces, etc) on top of the mechanical reels 309. Or, specific reels may be blocked from view for players based upon a mode of play.

Gaming machine 300 may also be connected to a slot system/player tracking database a buddy play server 330 via an IP or other equivalent switch. The buddy play server is also typically supplied with overhead signage information 332 displayable at each play station's overhead sign (not shown), in addition to a common reel display. Additionally, data on a system and gaming sessions may be transmitted to a slot system/player tracking database 334.

In the next several sections, additional embodiments of community lines will be presented via FIGS. 4-7 which are block diagrams illustrating community line reel display implementations.

Figure 4:
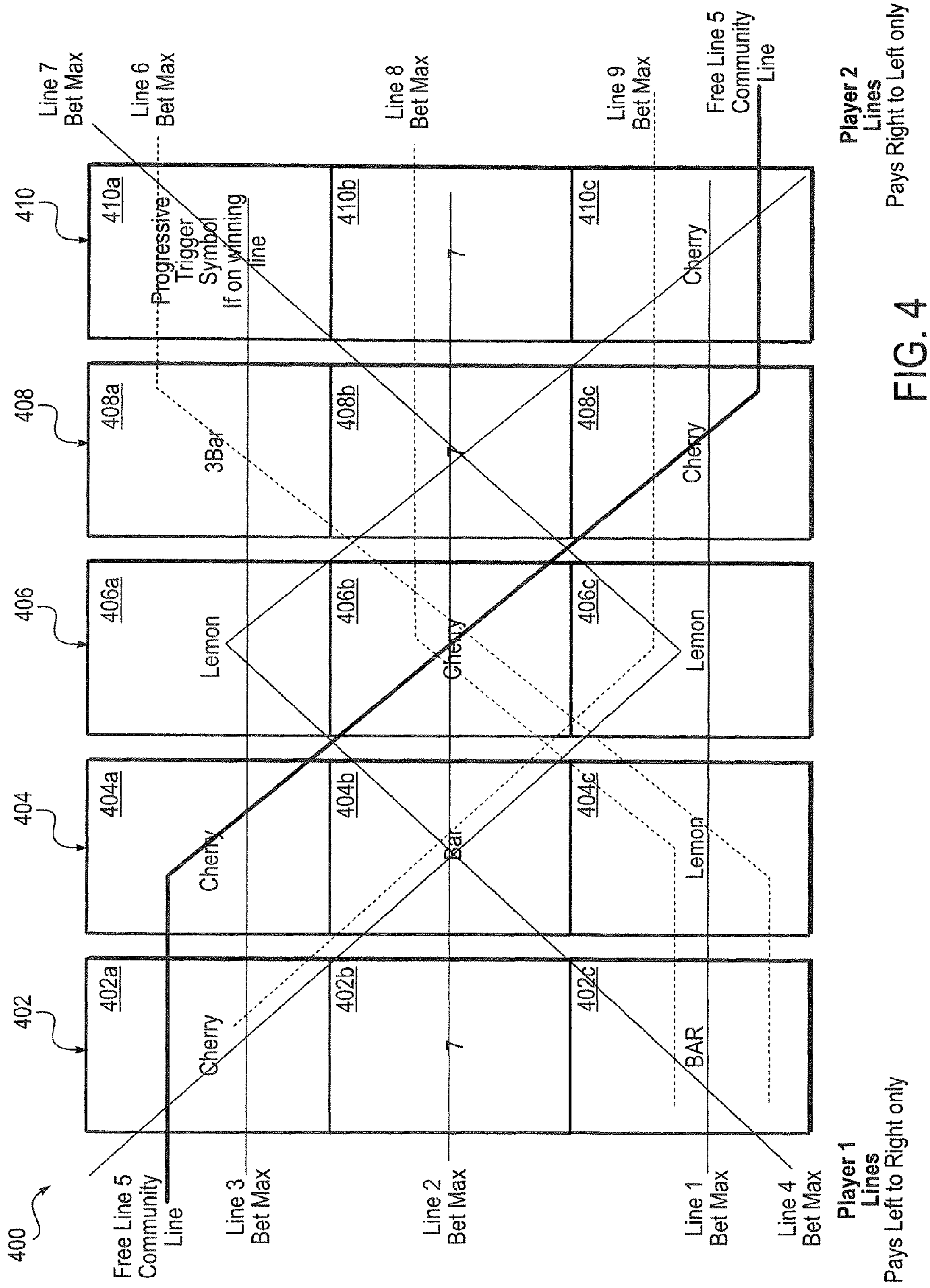
FIGS. 4-7 are illustrative examples of community line reel display implementations, in accordance with various embodiments.

FIG. 4 includes a reel display 400 with five reels 402, 404, 406, 408 and 410 whose displayed symbols may further be delineated into segments a, b and c for each reel 402, 404, 406, 408 and 410. For example, reel 402 may be further divided into segments 402*a*, 402*b* and 402*c*. For the purposes of describing the claimed embodiments, it should be understood that when a segment reel is referred to, it is meant to refer to that segment that is currently being displayed at that spot of the reel display. For example, referring to reel segment 402*c* which currently displays a "BAR," if reel 402 had stopped such that "BAR" is displayed at the center, where a "7" is displayed at reel segment 402*b* of FIG. 4, then "BAR" would therefore be designated as reel segment 402*b*.

Still referring to FIG. 4, one embodiment provides for specific lines to be designated to certain players for wagering wherein one player is not allowed to bet on the other player's designated lines. For example, a first player may be assigned reel line 1, reel line 2, reel line 3 and reel line 4 while a second player is assigned reel line 6, reel line 7, reel line 8 and reel line 9. An additional community line, reel line 5 is also provided that is available to both players, when both are playing, for wagering.

For the sake of clarity, reel line 1 bisects reel segments 402*c*, 404*c*, 406*c*, 408*c* and 410*c*. Reel line 2 bisects reel segments 402*b*, 404*b*, 406*c*, 408*b* and 410*b*. Reel line 3 bisects reel segments 402*a*, 404*a*, 406*a*, 408*a* and 410*a*. Reel line 4 bisects reel segments 402*c*, 404*b*, 406*a*, 408*b* and 410*c*. Reel line 5 bisects reel segments 402*a*, 404*a*, 406*b*, 408*c* and 410*c*. Reel line 6 bisects reel segments 402*c*, 404*c*, 406*b*, 408*a* and 410*a*. Reel line 7 bisects reel segments 402*a*, 404*b*, 406*c*, 408*b* and 410*a*. Reel line 8 bisects reel segments 402*c*, 404*c*, 406*b*, 408*b* and 410*b*. And, reel line 9 bisects reel segments 402*a*, 404*b*, 406*c*, 408*c* and 410*c*.

It should be noted that these are example lines and example assignments to players. Other arrangements and assignments can be implemented without departing from the scope of the claimed embodiments.

As can be seen, a reel line is not limited to a line that bisects adjacent reel segments. Reel lines may traverse reels at the diagonal such as reel line 4 going from reel segment 402*c* to 404*b* to 406*c* and so on. Reel lines, such as reel line 4 which traverses reels at the diagonal, may therefore be described as a reel line which is readable in a general direction be it right to left or left to right. Restated, reel line 4 is not a straight line but nonetheless travels along a generally traverse direction.

Typically, player 1 is allowed to wager an amount for reel lines 1-4 and player 2 is allowed to wager an amount for reel lines 6-9. If community reel line 5 results in a winning combination each player will be awarded for that combination according to the amount each wagered. Or, the first and second player may both be required to wager a sufficient amount in order to benefit from community reel line 5. Additionally, community reel line 5 may be provided to each player if they wager a sufficient amount, independent of each other. Furthermore, the community reel line 5 may be activated by a server as a bonus award as a marketing promotion.

Activation of community reel line 5, via funding from both players, may also affect a game combination change wherein frequency of wins, pay table changes and different symbols would take effect.

In another embodiment, there are no restrictions on which lines player may wager on. However, a first player's potential wins are determined by reading a reel line left to right and the second player's potential wins are determined by reading a reel line right to left. For example, for reel line 2 and the first player, the reel segments are read starting from reel segment 402*b* to 410*b*. For the second player, reel line 2 is read from reel segment 410*b* to 402*b*.

In yet another embodiment, there are no restrictions on which reel lines player may wager on and bother player's potential wins are judged in the same direction, left to right or right to left, depending on a selected configuration. If both players wager on a same number of lines over a minimum amount then the game may be modified to up any selected wagers to a maximum bet allowed. Further modifications may include additional bonus lines appearing at random, appearance of special symbols to create better winning outcome or more frequent winning outcomes like a wild symbol and a frequency of getting winning combinations may be affected or improved. Another option is for players to wager a same number of bets per line to obtain benefits of better payout results. This encourages one player to up their wager to the other player's level.

In a further embodiment, some reel lines are reserved for each player and other reel lines are available to both players for wagering. For example, lines 4, 5, and 6 are reserved for a first player, lines 7, 8 and 9 are reserved for a second player and lines 1, 2 and 3 are available to either player for wagering. Another line, not labeled, may also be made available as a community line. Additionally, another configuration of lines 1-9 could be implemented wherein one of lines 1-9 is designated as the community line.

A gaming machine screen showing a reel display, such as reel display 400 of FIG. 4, may be rendered for each player on a same video display with one reel set used for both players. Or, a reel display may be rendered twice on a same display for two players, an example of which is shown in reel display 502 of FIG. 5. Additionally, a reel display may be displayed on separate displays such as shown on reel displays 121 of FIG. 1. An alternate embodiment provides for two or more players playing on two or more separate gaming machines in proximity to each other, widely spaced physically at the same or different casinos or portal based game site. Each person would be able to see the community lines available on their display, their own lines, and optionally the others players lines on their display.

A community line may also be defined as a line that is achieved in group play mode where two or more players are playing a completely separate game or game combo, game theme. Each player is effectively playing a stand-alone gaming experience except that if triggering criteria occur then community lines will highlight. For example a community line is line 9 in a 9-line game. A player may only be able to wager on 8 lines normally when they are playing by themselves on the gaming device. If they get another player to wager on another gaming device on all 8 lines on his game combo only then will the community line show up on our separate gaming platforms. Community Line 9 would be judged on the first player's game against the paytable for that game combo being played by player 1. The second player's community line 9 will be judged against the paytable for the game combo being played by player 2. Restated, in various implementations, it is not required for the community line to act on a common reel set. The community line may be enabled for any reason by the system player tracking servers. Certain pre-defined groups of players may perhaps only be eligible for the community line. The community line may also, in various implementations, only show up in a group play bonus round or tournament once enough players are playing a group of machines.

If a common display is used for two gaming machines, CPUs from each of those two gaming machines may be networked in order to drive the common display. For a single display at a gaming machine, typically one game CPU or a server will be utilized. For a community line gaming session, data may pass between the two CPUs, of each gaming machine, to ensure that awards and credits are properly accounted for. Appropriate messaging or video streaming of content from one gaming device to the other may be provided to combine the data. For example the community line outcome would be told to both gaming machines and each machine could make its determination of any winning outcomes. Each gaming CPU would multiply its win per line times the credit multiplier for those winning lines and would award to the players win meter. Alternately, a CPU of one gaming machine may be the master and render all content to the gaming screen. All winning combinations may be determined by the master CPU in this one machine. The results may be sent to the second gaming/slave CPU to add to its credit meter or to an associated EGM or player account in a server or other storage device.

Figure 5:
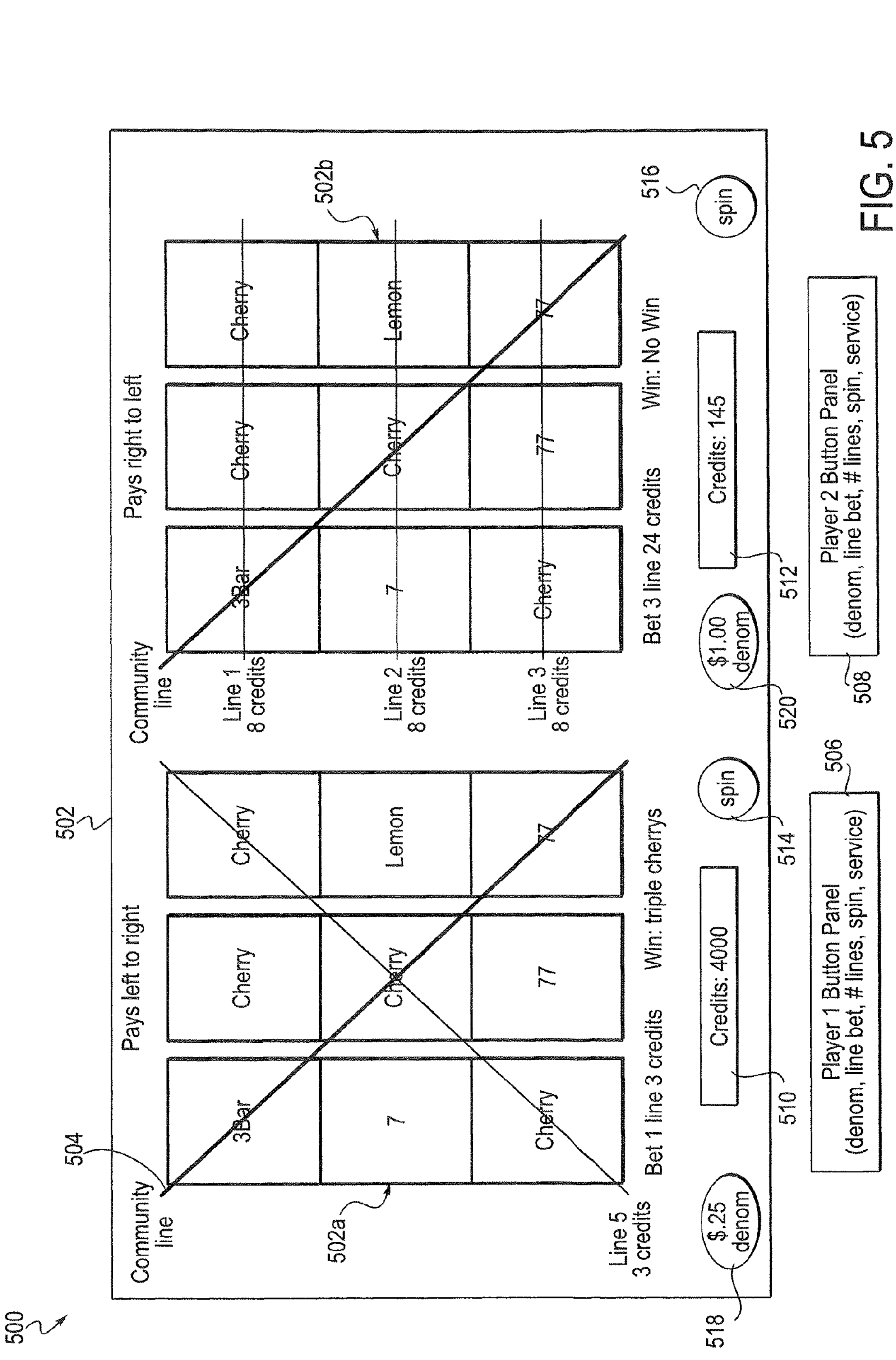

FIG. 5 is a screenshot 500 of a reel display 502 wherein reel display 502 is divided into two portions which depict identical reel sets 502*a*, 502*b* in that when they spin, both reel sets 502*a*, 502*b* will display identical symbols at each reel segment. Screenshot 500 also includes first and second player button panels 506, 508, credit amount indicators 510, 512, spin buttons 514, 516 and selected wager amounts 518, 520.

Typically, each player gets awarded for their own lines scaled to their unique wagers size. Also, each player may share in a community line 504. In one embodiment each player may be presented with an identical game on two separate game machines. Additionally, each reel set 502*a*, 502*b* may start spinning at the same time or different times, but the stop positions or symbols shown would be identical for the two players.

Figure 6:
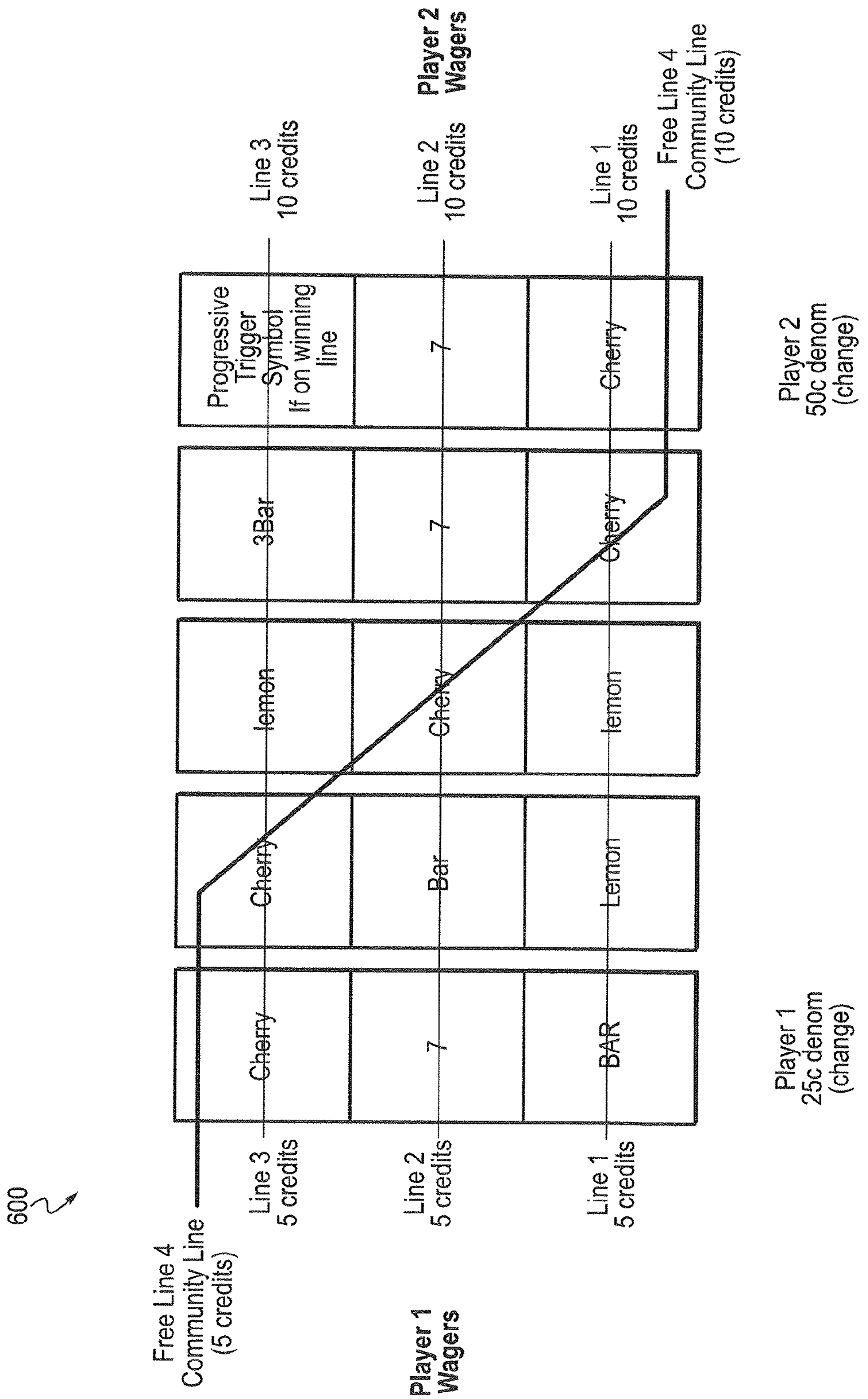
Figure 7:
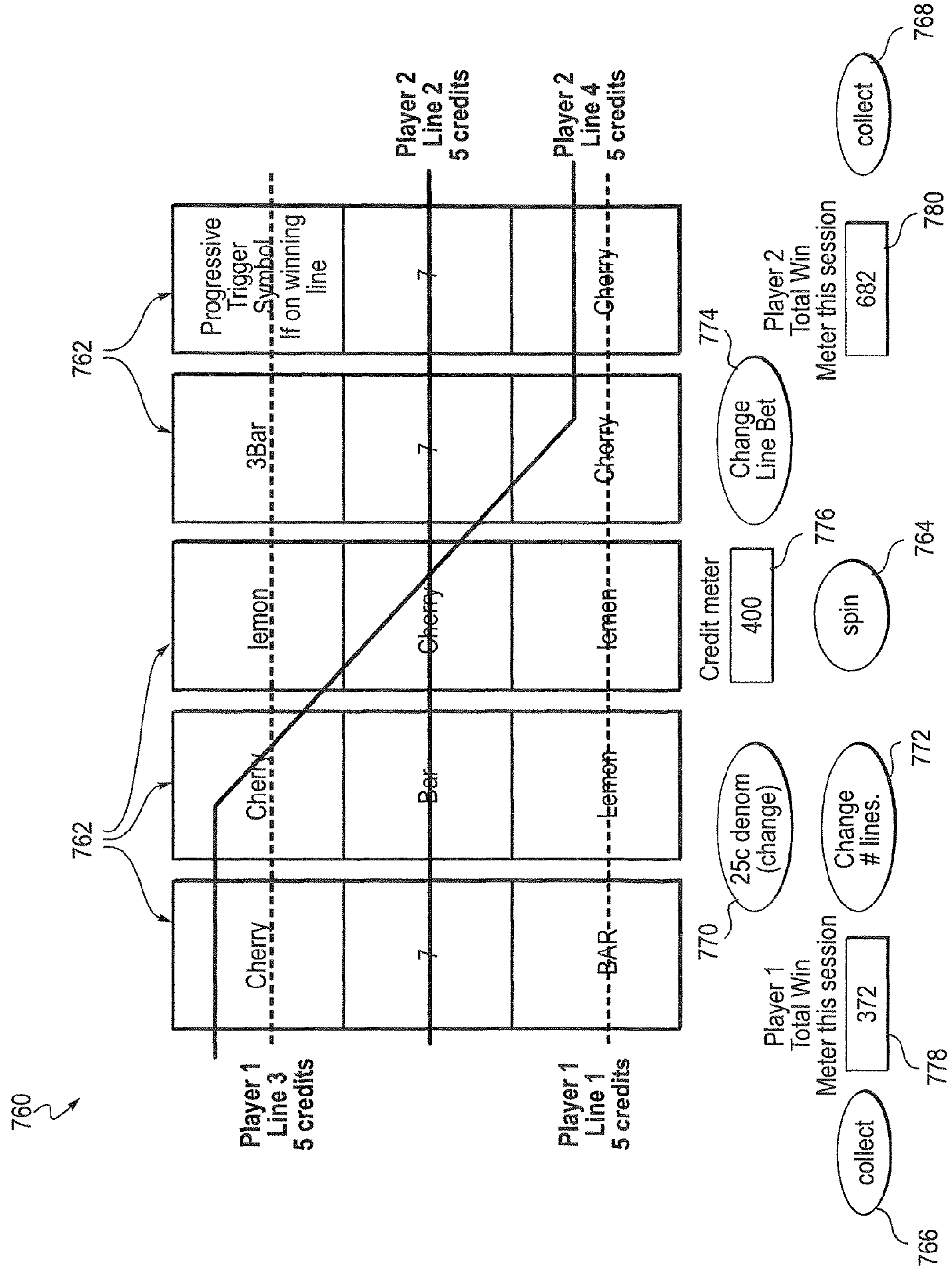

FIG. 6 illustrates a reel display 600 wherein players may wager on the same lines but wager different amounts. For example a first player may bet five credits at $1 per credits on line 1-3 and player two may bet ten credits at $0.25 per credit on lines 1-3. To activate community line 4, both players would need to require a minimum wager or satisfy some other condition. Additionally, extra community lines may also be provided when that minimum wager, or other wager levels, or conditions are satisfied. These extra community lines are given as an incentive to the players to bet together and with larger line and/or wagers.

In some embodiments there may be a common credit meter on a gaming device for two players to play from. This is demonstrated in screenshot 760 of FIG. 7 which includes a reel set 762, spin button 764, collect buttons 766, 768, wager buttons 770, 772, change line bet button 774, credit meter 776 and player 1 and 2's win meters 778, 780. Credit meter 776 may be incremented by the insertion of cash or ticket voucher into the gaming device or funded using a player funds account.

A press on the spin button 764 will commit the same wager amount for each player accordingly. In one embodiment, each player will have their own spin button. Based upon a wager size or actual verses theoretical win, additional community line may appear and be funded. Winning combinations on additional community lines would award to each player's win meters 778, 780.

Winning outcomes on each player's lines would be judged and awarded to win meters 778, 780. Each player's win meters 778, 780 may be cashed out separately in two different vouchers or applied to two different player accounts or account storage device like a smart card. This advantageously allows for two friends, a husband and wife, etc. to insert some of their money into the gaming machine and play a community game together, but be judged differently on the same game. Each player be able to compete against the other for who gets the bragging rights to who brought in the most money for a family. In some embodiments the separate win meters 778, 780 may only be to convey a measure of success. All wins may deposit back into games a credit meter. The separate win meters 778, 780 may be reset after each new spin or may accumulate over multiple spins/games during this session. A common cash voucher may be printed at the end of the game session and another ticket would be printed with both persons win meters over the session. This also enhances bragging rights when a couple arrives home. A player whose meter has a larger number would be deemed the winner Alternatively, a cash voucher may have separate win meters printed on it as well. If both players are identified by using a player cards, or logging into their accounts, then their names and scores may be shown up on signage throughout a casino for additional bragging rights. This data may be presented at casino web portals as well.

The described embodiments may occur via various types of gaming machines. For example, a community game may be shown on an EGM display, an iview game display, a top monitor display, a web portal gaming site, a handheld gaming device, a table gaming device, a cell phone device, a home game console device, overhead signage, a home television, an arcade gaming device, a casino gaming device etc. All of these devices may communicate to a common set of servers and/or game engines and allow for this common reel game being played and allowing players to play different pay lines and also have some community pay lines.

A wireless handheld in communication with and EGM, table game, or gaming network may present the exact same game on its screen as the EGM it is in communication with. This back-betting feature would allow players to wager on different lines on the community line game.

Figure 8:
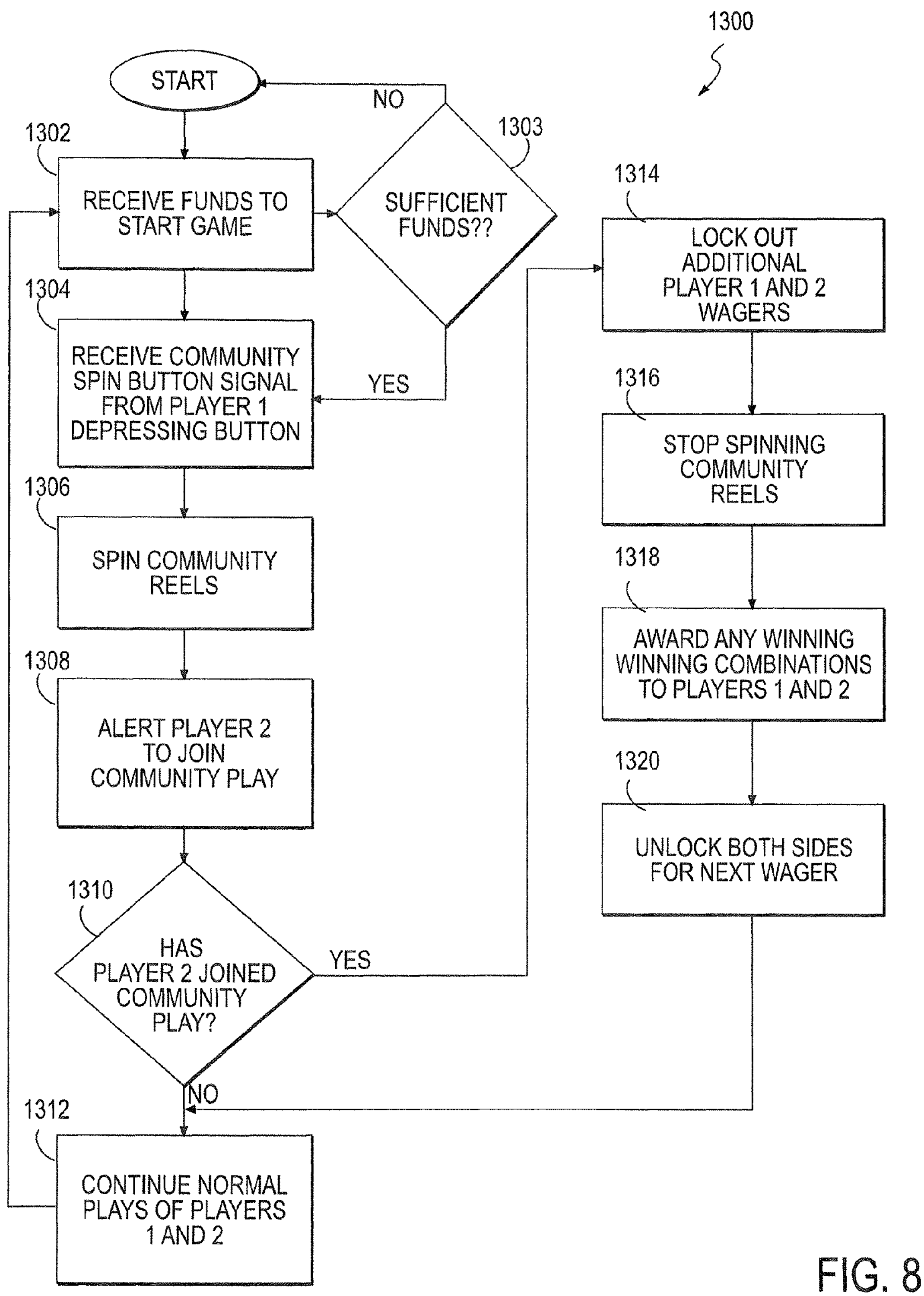
FIG. 8 is a flowchart illustrating a method for community play set forth by way of example and not limitation.

FIG. 8 describes a method 1300 wherein a first player initiates community play. Method 1300 may be implemented by a processor or CPU such as CPU 205 of FIG. 2. First, funds are received from a first user to start a game session 1302. If there are sufficient funds 1303 then a community spin signal initiates community play 1304, via the first player depressing a community spin button, or equivalents thereof. Community reels then spin 1306, alerts a second player to join community play 1308 and it is determined 1310 if the second player agrees to join community play. An example of how the second player may agree to join community play is if they depress their community play button. Again, other input-types can be utilized by the second player to signal that they will participate in community play. Typically, the second player will be given a time period in which to participate in community play. If the time period expires and no selection has been made, then community play is canceled.

If the second player elects to not join community play 1310, normal play for the first and second players continue 1312. Otherwise, additional wagers, from the first and second players, is locked out 1314 and spinning of the community reels stops 1316. As previously indicated, community reels may include specially-designated reels combined with a player's reels, combining reels from a first and second player, awarding combinations to both players based on reels of each player, etc. Any winning combinations are then awarded to the first and second players 1318 and play stations of the first and second player are unlocked for a next wager 1320.

Figure 9:
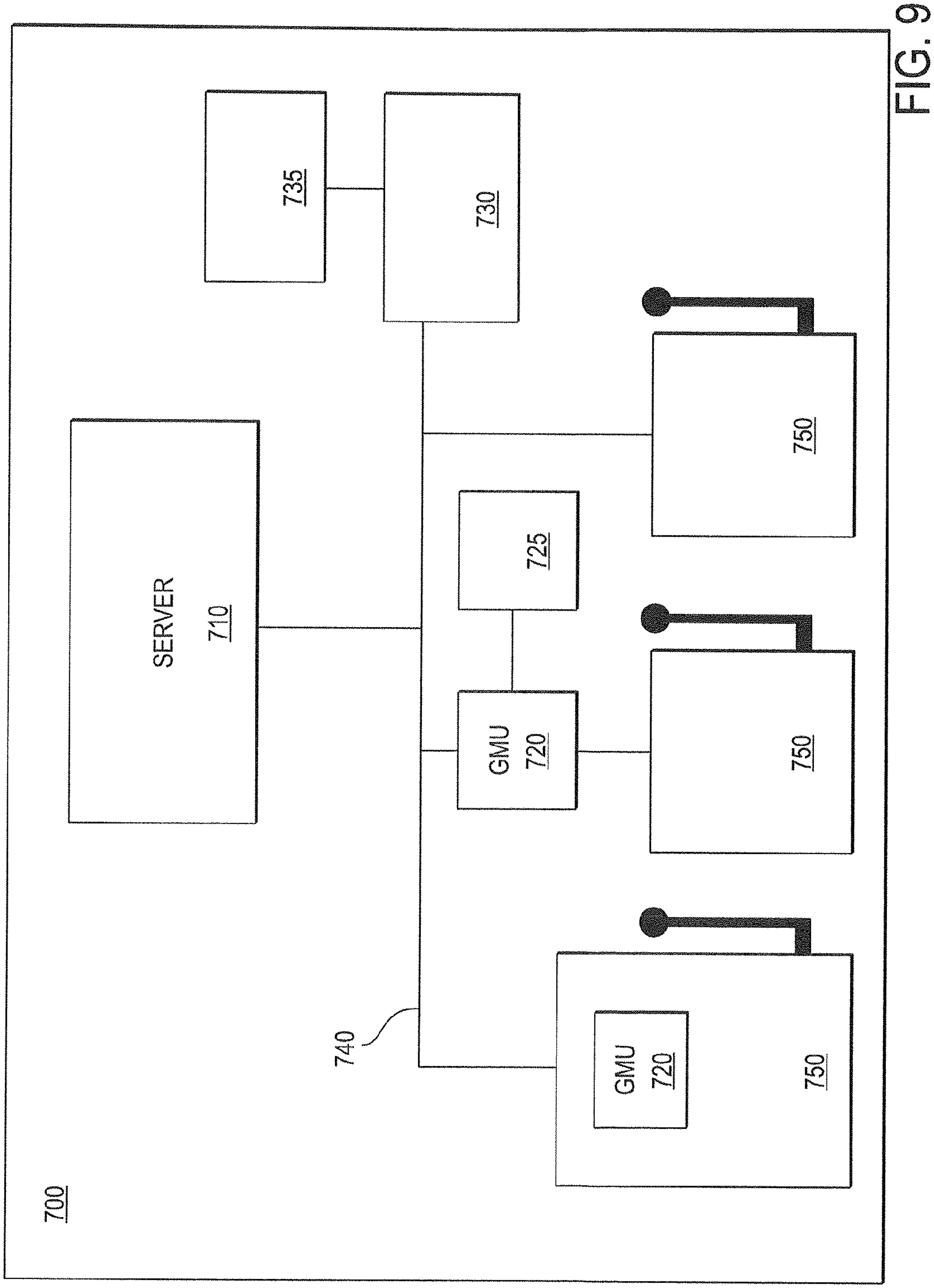
FIG. 9 is a block diagram illustrating elements of an example of a networked gaming system, in accordance with an embodiment.

FIG. 9 is a block diagram illustrating hardware elements of a networked gaming system 700, in accordance with an embodiment. System 700 includes server 710, gaming machines 750 and network 740 connecting gaming machines 750 to server 710. Additionally, gaming display computer 730 is shown to network 740. Server 710 may be selected from a variety server types. The type of server used is generally determined by the platform and software requirements of the gaming system. Examples of suitable servers are an IBM RS6000-based server, an IBM AS/400-based server or a Microsoft Windows-based server, but it should be appreciated that any suitable server may be used. The server 710 may be configured as a single "logical" server that comprises multiple physical servers. Gaming machines 750 operate similar to conventional peripheral networked terminals. Gaming machines 750 have a player interface such as a display, a card reader and selection buttons through which gaming machines 750 interact with a player playing a wagering game. The player interface is used for making choices such as the amount of a bet or the number of lines to bet. Gaming machines 750 also provide information to server 710 concerning activity on gaming machines 750 and provide a communication portal for players with server 710. For example, the player interface may be used or selecting different server-related menu options such as, but not limited to, transferring a specified number of credits from a player account onto the credit meter of the gaming machine, or for transferring credits from the gaming machine to a central player account.

In various embodiments, any of the gaming machines 750 may be a mechanical reel spinning gaming machine, a video reel spinning gaming machine or combinations thereof that include a point-based award. Networking components (not shown) facilitate communications across network 740 between the system server 710 and game management units ("GMU") 720 and/or gaming display control computers 730 that control displays for carousels of gaming machines. GMU 720 connects gaming machines to networking components and may be installed in the gaming machine cabinet or external to the gaming machine. The function of the GMU is similar to the function of the a network interface card connected to a desktop personal computer ("PC") and it may contain tracking software which provides notification to the casino of certain events on a gaming machine 750, including wins. Depending upon the casino management system, payouts on large wins at gaming machines 750 may be made directly to a player account managed by the host computer; in which case, the player is notified by of the GMU at gaming machine 750 that the player's account has been credited.

Some GMU's have much greater capability and can perform such tasks as presenting a game having a point-based award using a display 725 operatively connected to GMU 720. In various embodiments, GMU 720 is located outside or inside the gaming machine. Optionally, in an alternative embodiment, one or more gaming machines 750 connect directly to the network and are not connected to a GMU 720. Displays related to games offering a point-based award on gaming machines 750 or GMU displays 725 may also be presented on gaming display 735 by gaming display controller 730.

A gaming system of the type described above also allows a plurality of games, in accordance with the various embodiments, to be linked under the control of server 710 for cooperative or competitive play in a particular area, carousel, casino or between casinos located in geographically separate areas.

It should also be noted that a gaming system may also comprise other types of components and the above illustrations are meant only as examples and not as limitations to the types of components or games having a point-based award. Additionally, it may further be appreciated that each of the games could be operated on a remote host computer such that a player initiates play with the host computer over a network via the player interface and gaming machine 750 operates the respective gaming and video displays in conjunction with the game whose play is controlled by the remote computer.

It should furthermore be noted that certain combinations described herein may be used in non-gaming environments, such as in an arcade environment (e.g. with games of skill rather than games of chance), as indicators, etc. as will be appreciated by those of skill in the art.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A game system comprising:

a game server;

a plurality of game apparatuses coupled to the game server wherein each game apparatus includes:

a first play station comprising a first plurality of reels rotatable about a first horizontal axis and having a first horizontally configured reel line, wherein a winning combination from said first reel line pays at said first play station;

a second play station comprising a second plurality of reels rotatable about a second horizontal axis and having a second horizontally configured reel line, wherein a winning combination from said second reel line pays at said second play station;

a common reel display of the first and second play stations comprising a third plurality of reels rotatable about a third horizontal axis and including one or more horizontally configured community reel lines, wherein winning combinations of the one or more community reel lines pay at both the first and second play stations; and a spin mechanism causing the common reel display to spin;

wherein different reel lines of the common reel display are reserved for the first and second play stations and wherein the first play station includes a first plurality of lines which pay left to right and the second play station includes a second plurality of lines which pay right to left.

2. The game system as recited in claim 1 wherein the common reel display is repeated at the first reel display of the first play station and at the second reel display of the second play station.

3. The game system as recited in claim 1 wherein the one or more community reel lines are enabled upon entry of a wager of a certain amount at the first or second play station.

4. The game system as recited in claim 1 wherein the one or more community reel lines are enabled by a triggering event.

5. The game system as recited in claim 1 wherein the common reel display is displayed on an overhead display.

6. The game system as recited in claim 1 wherein the common reel display is repeated at the first reel display of the first play station and at the second reel display of the second play station.

7. The game system as recited in claim 1 wherein the one or more community reel lines is available to the first and second play stations when both are in use.

8. A game system comprising:

a game server;

a plurality of game apparatuses coupled to the game server wherein each game apparatus includes:

a first play station comprising a first plurality of reels rotatable about a first horizontal axis and having a first horizontally configured reel line, wherein a winning combination from said first reel line pays at said first play station;

a second play station comprising a second plurality of reels rotatable about a second horizontal axis and having a second horizontally configured reel line, wherein a winning combination from said second reel line pays at said second play station;

a common reel display of the first and second play stations comprising a third plurality of reels rotatable about a third horizontal axis and including one or more horizontally configured community reel lines, wherein winning combinations of the one or more community reel lines pay at both the first and second play stations; and a spin mechanism causing the common reel display to spin;

wherein a first plurality of reel lines of the common reel display are reserved for the first play station and a second plurality of reel lines of the common reel display are reserved for the second play station.

9. The game system as recited in claim 8 wherein the one or more community reel lines is available to the first and second play stations when both are in use.

10. The game system as recited in claim 8 wherein the common reel display comprises mechanical reels, video reels or mechanical and video reels.

11. The game system as recited in claim 8 wherein the common reel display is the first reel display of the first play station and the second reel display of the second play station wherein the first and second reel displays depict a common set of reels.

12. The game system as recited in claim 8 wherein two or more CPUs drive each gaming apparatus.

13. The game system as recited in claim 8 wherein the first plurality of reel lines are readable in a first general direction and wherein the second plurality of reel lines are readable in a second general direction, opposite the first direction.

14. A game system comprising:

a game server;

a plurality of game apparatuses coupled to the game server wherein each game apparatus includes:

a first play station comprising a first plurality of reels rotatable about a first horizontal axis and having a first horizontally configured reel line, wherein a winning combination from said first reel line pays at said first play station;

a second play station comprising a second plurality of reels rotatable about a second horizontal axis and having a second horizontally configured reel line, wherein a winning combination from said second reel line pays at said second play station;

a horizontally configured common reel display of the first and second play stations comprising a third plurality of reels rotatable about a third horizontal axis;

a spin mechanism causing the common reel display to spin; and wherein different reel lines and at least one shared reel line are reserved for the first and second play stations and wherein the first play station includes a first plurality of lines which pay left to right and the second play station includes a second plurality of lines which pay right to left.

15. The game system as recited in claim 14 wherein the at least one shared reel line is enabled via a triggering event.

16. The game system as recited in claim 15 wherein the triggering event is a minimum wager entered at either the first or second play stations.

* * * * *